United States Patent
VanLaningham et al.

(10) Patent No.: US 7,551,895 B1
(45) Date of Patent: Jun. 23, 2009

(54) PROGRESSIVE DIRECTIONAL ROUTING PROTOCOL FOR DIRECTIONAL MODE AD HOC NETWORKS

(75) Inventors: Steven VanLaningham, Richardson, TX (US); Chyi N. Sheng, Richardson, TX (US); John L. Tipton, Denton, TX (US); Alan D. Amis, Plano, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 248 days.

(21) Appl. No.: 11/515,054

(22) Filed: Sep. 1, 2006

(51) Int. Cl.
*H04B 7/00* (2006.01)

(52) U.S. Cl. .................. 455/41.2; 455/11.1; 455/67.11; 370/315; 370/243

(58) Field of Classification Search ................. 370/241, 370/252, 315, 318–320, 329, 331–339, 752, 370/901, 908, 389, 397, 399; 455/41.2, 221, 455/225, 248, 63.1, 426.1, 575.1, 82, 84, 455/41.3, 418–420, 414.2, 445, 69, 67.11, 455/456.1–457, 450; 709/238–242
See application file for complete search history.

(56) References Cited

U.S. PATENT DOCUMENTS

| | | | | |
|---|---|---|---|---|
| 5,339,316 A | * | 8/1994 | Diepstraten | 370/401 |
| 6,141,335 A | * | 10/2000 | Kuwahara et al. | 370/342 |
| 6,839,542 B2 | * | 1/2005 | Sibecas et al. | 455/41.2 |
| 7,085,541 B2 | * | 8/2006 | Redi et al. | 455/69 |
| 7,099,697 B2 | * | 8/2006 | Okawa et al. | 455/562.1 |
| 7,349,326 B1 | * | 3/2008 | Zadikian et al. | 370/216 |
| 2003/0195005 A1 | * | 10/2003 | Ebata | 455/445 |
| 2004/0131032 A1 | * | 7/2004 | Sendonaris et al. | 370/335 |
| 2007/0297365 A1 | * | 12/2007 | Li et al. | 370/331 |

* cited by examiner

*Primary Examiner*—Nick Corsaro
*Assistant Examiner*—Babar Sarwar

(57) ABSTRACT

A method of communicating in a mobile ad-hoc network is disclosed. It is determined whether a first directional transmission path between a transmitting node and a destination node is known to be free from obstruction. The transmitting node transmits a message to the destination node using the first directional transmission path. The message is retransmitted to the destination node using the first directional transmission path when a message receipt acknowledgement in an omnidirectional network transmission has not been received within a predetermined time. Additional transmissions via the first directional transmission path are blocked when the message receipt acknowledgement has not been received after more than a pre-set number of retransmissions. The message is transmitted to a proxy node using a second directional transmission path between the transmitting node and the proxy node, with instructions for the proxy node to directionally transmit the message to the destination node.

20 Claims, 5 Drawing Sheets

| TO | PATH | STATUS | TIME (sec) |
|---|---|---|---|
| N1 | P41 | GOOD | 0.75 |
| N2 | P42 | GOOD | 30 |
| N3 | P43 | GOOD | 2.5 |
| N5 | P45 | UNKNOWN | 60 |
| N6 | P46 | BLOCKED | 2 |
| ... | ... | ... | ... |

PROGRESSIVE DIRECTIONAL ROUTING PROTOCOL FOR DIRECTIONAL MODE AD HOC NETWORKS

FIELD OF THE INVENTION

The invention relates to communications networks, and more particularly, to improving data flow through mobile ad hoc networks.

BACKGROUND OF THE INVENTION

Directional mobile ad-hoc networks use directional antennas to communicate between nodes. A directional antenna is one that sends and receives signals in a limited direction. When compared to omnidirectional antennas, which send and receive signals in every direction, directional antennas typically provide higher throughput rates and stronger signals for a given power output level, thereby increasing the distance a signal can be transmitted. Directional antennas may also decrease the time needed for a signal to pass through the network because fewer intermediate nodes are required to handle the signal. However, directional antennas are not well suited for use in situations where directional links can become blocked by terrain or urban obstacles. In a mobile wireless network, blockages can occur at any time because the nodes are capable of moving behind or under any of a variety of signal-blocking obstacles. Network maintenance information, such as node location and transmission availability, can be compromised by a blocked directional transmission. A network using directional transmissions must be able to detect and re-route a message around any such signal-blocking obstacles. Because nodes in a mobile network are capable of movement relative to each other, it would also be important to periodically re-evaluate the effects of signal-blocking obstacles on directional transmissions.

It is therefore an object of the invention to mitigate the effects of terrain and other signal blocking obstacles on directional signals in a mobile ad-hoc network.

It is another object of the invention to prevent loss of network maintenance information, such as node location and transmission availability, because of an obstructed directional transmission.

It is still another object of the invention to periodically re-evaluate blocked directional transmission paths to see if the paths can once again be used.

A feature of the invention is a network using directional transmissions to communicate messages between nodes, and using omnidirectional transmissions to transmit and receive network maintenance information.

Another feature of the invention is a protocol that transmits messages to a proxy node using directional transmissions when a directional transmission route to an intended target node is blocked or otherwise unavailable.

An advantage of the invention is that operation of the network is not dependent on the quality of directional transmission paths.

Another advantage is that directional transmissions can be effectively used in a mobile ad-hoc network.

SUMMARY OF THE INVENTION

The invention provides a method of communicating in a mobile ad-hoc network having a plurality of nodes where each node is configured to transmit and receive information, directionally and omnidirectionally, from other nodes in the network. It is determined whether a first directional transmission path between a transmitting node and a destination node is known to be free from obstruction. The transmitting node transmits a message to the destination node using the first directional transmission path. The message is retransmitted to the destination node using the first directional transmission path when a message receipt acknowledgement in an omnidirectional network transmission has not been received within a predetermined time. Additional transmissions via the first directional transmission path are blocked when the message receipt acknowledgement has not been received after more than a pre-set number of retransmissions. The message is transmitted to a proxy node using a second directional transmission path between the transmitting node and the proxy node, with instructions for the proxy node to directionally transmit the message to the destination node.

The invention also provides a method of communicating in a mobile ad-hoc network having a plurality of nodes. Network bootstrap data is transmitted through the network using omnidirectional transmissions. The transmitting node transmits a message to the destination node using a first directional transmission path when the first directional transmission path is known to be free from obstruction. Transmissions via the first directional transmission path are blocked when a message receipt acknowledgement in an omnidirectionally transmitted bootstrap data package has not been received after more than a pre-set number of retransmissions. The message is transmitted to a proxy node using a second directional transmission path between the transmitting node and the proxy node, with instructions for the proxy node to directionally transmit the message to the destination node, when it is determined the first directional transmission path has been blocked.

The invention further provides a communications device for use in a mobile ad-hoc network. A transceiver is configured to transmit and receive messages to and from other communications devices in the network. An omnidirectional antenna is connected to the transceiver and configured to broadcast and detect network bootstrap data to and from other communications devices in the network. A directional antenna is connected to the transceiver and configured to broadcast and detect messages to and from other communications devices in the network. A memory maintains a list of directional transmission paths from the communications device to other communications devices in the network, the list also including a status of each directional transmission path. A processor instructs the transceiver to transmit a message to a first one of the other communications devices in the network using a first directional transmission path when the status of the first directional transmission path indicates the first directional transmission path is unobstructed. The processor instructs the transceiver to transmit the message to a second one of the other communications devices in the network using a second directional transmission path, with instructions for the second one of the other communications devices to transmit the message to the first one of the other communications devices when the status of the first one of the other communications devices indicates the first directional transmission path is obstructed.

DETAILED DESCRIPTION OF THE DRAWINGS

Figure 1:
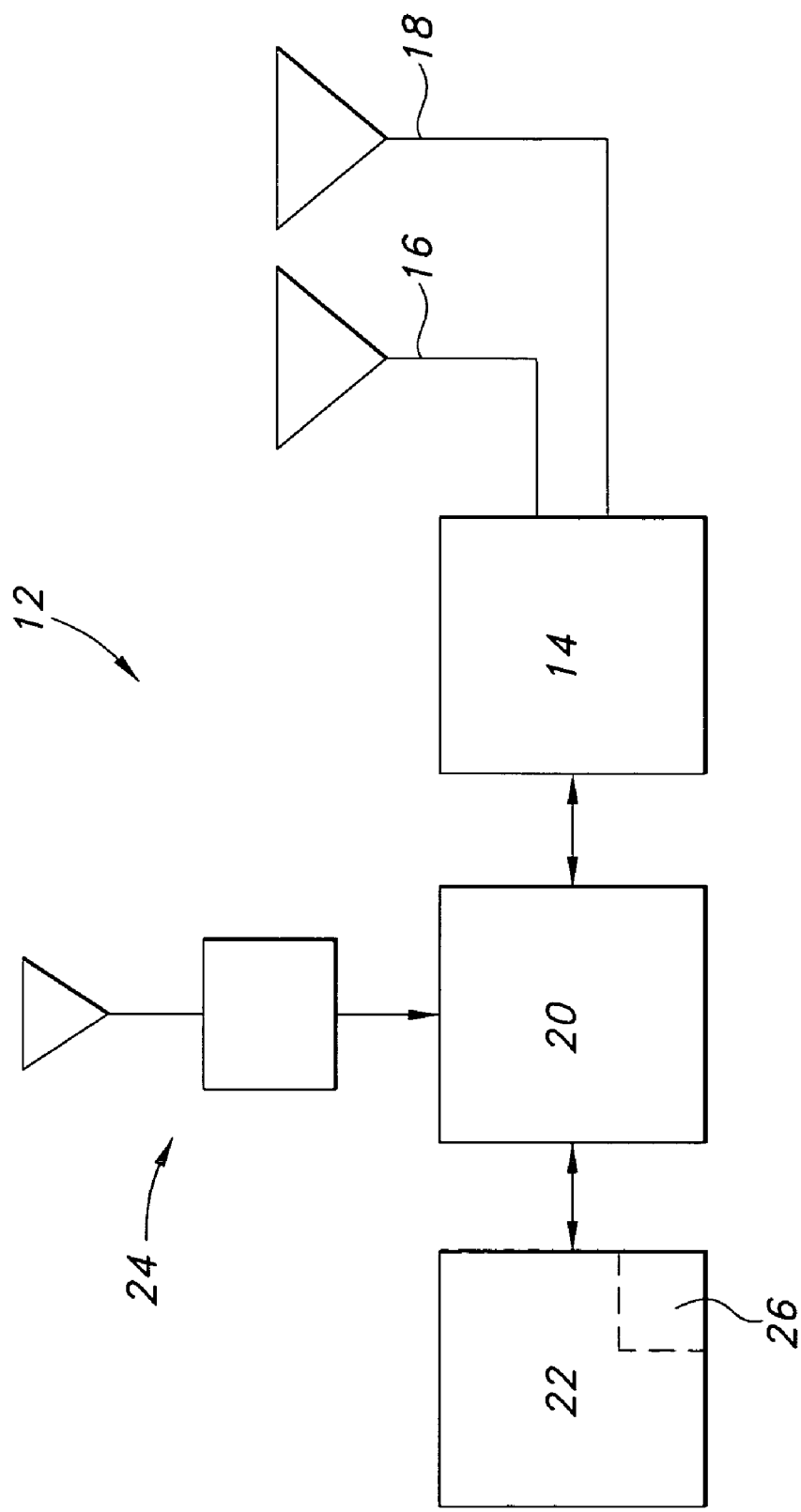
FIG. 1 is a schematic diagram of a communications device according to the invention.

FIG. 1 depicts a communications device 12 that may function as a node in a network. Communications device 12 includes a transceiver 14 configured to receive and transmit messages to other nodes in a network. A directional antenna 16 is connected to transceiver 14. Directional antenna 16 sends and receives signals in a specific direction, and according to the invention the directional antenna is used for transmitting/receiving data to and from a specified target node in the network at a high data throughput rate. An omnidirectional antenna 18 is also connected to transceiver 14. Because of its transmission pattern, omnidirectional antenna 18 typically has a much smaller range than directional antenna 16 at equivalent power levels. Omnidirectional antenna 18 is configured to transmit information relevant to the operation of the network, including acknowledgement data that indicates a message sent using directional antenna 16 was properly received by the intended node.

A processor 20 is operationally connected to transceiver 14. Processor 20 accepts inputs, performs calculations, and provides output data and commands relevant to the operation of the invention. For example, Processor 20 manages a list of messages that are to be re-transmitted by transceiver 14 if certain conditions apply. This re-transmit queue is described in more detail herein. The processor also provides a timer function that assists in determining how long ago a message has been sent via directional antenna 16. The timer function also assists in determining the most recent successful directional transmission to each possible receiving node in the network. Processor 20 makes updates to a directional transmission path table, stored in an integral or attached memory 22, which will be further described herein. The processor further accepts inputs from a location information receiver 24 that provides the processor with periodic updates of the geographic location of communications device 12. Location information receiver 24 preferably uses signals from global positioning system (GPS) satellites (not shown) or a similar system to determine its location. Processor 20 may also perform tasks not directly related to the operation of the invention.

Figure 2:
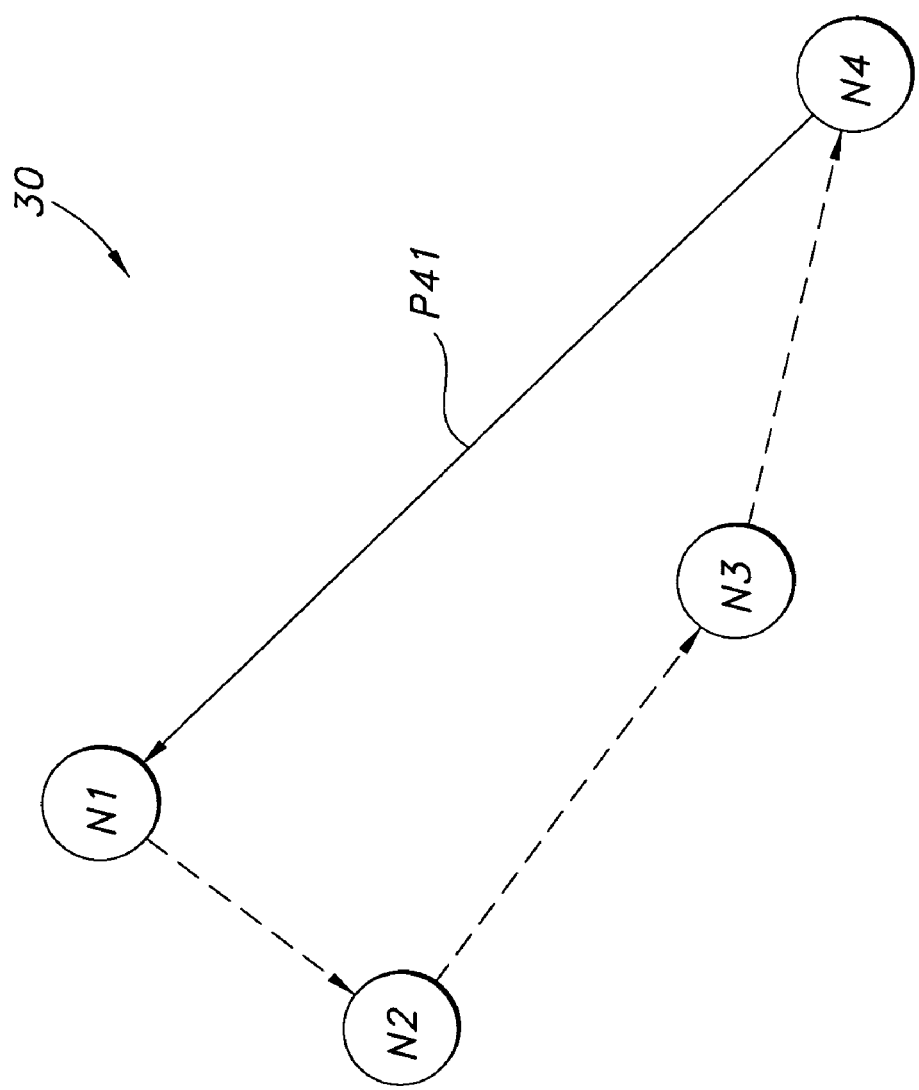
FIG. 2 is a simplified plan view of a communications network according to the invention.

FIG. 2 shows a simplified view of a mobile ad-hoc network 30 according to the invention. Network 30 includes nodes N1, N2, N3 and N4. Each node in the network includes a communications device having functionality substantially similar to communications device 12. Nodes N1, N2, N3, and N4 communicate with each other according to known protocols. In a military communications network each communications device is associated with a mobile or stationary asset, such as a command center or other stationary structure, troop unit, artillery unit, land-based vehicle, sea-based vehicle, or airborne vehicle. In a non-military network each communications device may be similarly associated with vehicles, individuals, caller control centers, relay stations, or the like. Network 30 may be structured so that communications devices can enter and exit the network at will, and therefore may be characterized as an ad-hoc network. Each node in network 30 is capable of communicating to its neighboring nodes via messages transmitted via its omnidirectional antenna. As shown in FIG. 2 communications capabilities using the omnidirectional antennas are represented by dashed lines. According to the invention each node transmits network maintenance data, otherwise known as bootstrap data, through the network using the omnidirectional communications capabilities of the nodes. A pictorial representation of a representative bootstrap data packet is shown at 32 in FIG. 3. The bootstrap data packet typically includes node data 34, which includes information about the existence, location, movement, and availability of each node, or of a group of nodes relevant to each receiving node, to receive or re-transmit data through the network. The bootstrap data packet may communicate the network resource availability 36, such as transmission times and channels, and may even provide scheduling protocols 38 to determine how each node may reserve or schedule network resources to transmit data through the network. Depending on the topology of the network, the bootstrap data may further provide a complete or limited topology 40 of the network to each node. Lastly, bootstrap data packet 32 includes acknowledgement information 42 that indicates whether data sent via the directional antennas was received by the intended destination node.

Figures 3, 4:
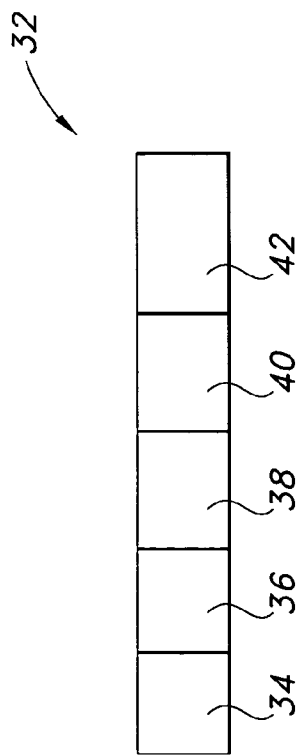
FIG. 3 is a conceptual view of a bootstrap data packet according to the invention.
FIG. 4 is a directional transmission path table according to the invention.

In addition to bootstrap data transmitted via omnidirectional antennas through the network, each node in the network maintains in memory information on each directional transmission path relevant to that node. For example, node N4 in FIG. 2 maintains in memory 24 a listing or table of the status of the directional transmission paths between it and nodes N1, N2 and N3. As shown in FIG. 4, the directional transmission path table 46 may mark or label directional transmission paths as GOOD when previous attempts to transmit using that directional transmission path were successful. A directional transmission path may be marked as BLOCKED when a previous attempt to transmit using that transmission path was unsuccessful as determined using a process herein described. Such unsuccessful directional transmission attempts may be caused by structural or geographic obstacles such as mountains, varied terrain, dense foliage, or buildings. Since nodes in a mobile ad-hoc network are by definition capable of relative movement and changes in subsequent position, geographic or structural obstacles may no longer obstruct a transmission path, and it may therefore be possible to use a blocked directional transmission path after time has passed. Therefore, a directional transmission path may be marked as UNKNOWN when a predetermined amount of time has elapsed since a transmission using the directional transmission path was unsuccessfully attempted. Conversely, if a directional transmission path labeled as GOOD has not been used for a sufficiently long period of time, it is possible that the path has been blocked by a geographic or structural obstacle. Therefore, a directional transmission path marked as GOOD will be changed to UNKNOWN when the path has not been used for a sufficiently long period of time.

Operation of the invention will now be explained with reference to FIGS. 1-4. When a node such as node N4 (the transmitting node) desires to transmit a data package to a distant node such as node N1 (the receiving node), node N4 first consults its directional transmission path table 46 (FIG. 4) to determine the status of directional transmission path P41. If directional transmission path P41 is labeled GOOD, node N4 accesses bootstrap data received through the omnidirectional antennas as previously described. Node N4 uses the bootstrap data to determine the location of node N1 relative to node N4. Node N4 then determines whether node N1 is in its expected line of sight communications range. This may be accomplished by estimating the path loss using a modified Free-space path Loss equation (modified to account for deviation from free-space) and then computing the expected signal-to-noise ratio of signal path P41 using the transmit power at Node N4 and the gain of the antennas at N1 and N4. This calculation can be made more accurate (if needed) by preloading the antenna gain pattern(s) of the directional antennas and computing the antenna gains based on the pointing angle between the nodes using the positional data transmitted in the bootstrap packets. If the expected signal-to-noise ratio at N1 is sufficiently high, it is concluded that node N1 is within the expected line-of-sight communications range of node N4, and node N4 transmits the data package to node N1 using directional antenna 16. The data package, or a memory address indicating the stored location of the data package in memory 22, is stored in a retransmit queue 26, which is a listing of message sent via directional antenna, where messages are maintained in the list until receipt of the message is acknowledged or until the message is judged too old for retransmission. Processor 20 periodically increases the retransmit time function associated with the data package. Node N4 waits for an acknowledgement that the data package was successfully received by node N1.

When node N1 receives the data package and verifies the data package was correctly sent, node N1 adds an acknowledgement message to the bootstrap data package it transmits using omnidirectional antenna 18. If the acknowledgement message is received within a certain time, Node N4 removes the data package from retransmit queue 26. If the acknowledgement message is not received within the certain time, or if node N1 transmits a message in its bootstrap data package that the data package was not correctly or fully received, processor 20 instructs transceiver 14 to retransmit the data package directly to node N1 using the directional antenna.

Figure 5:
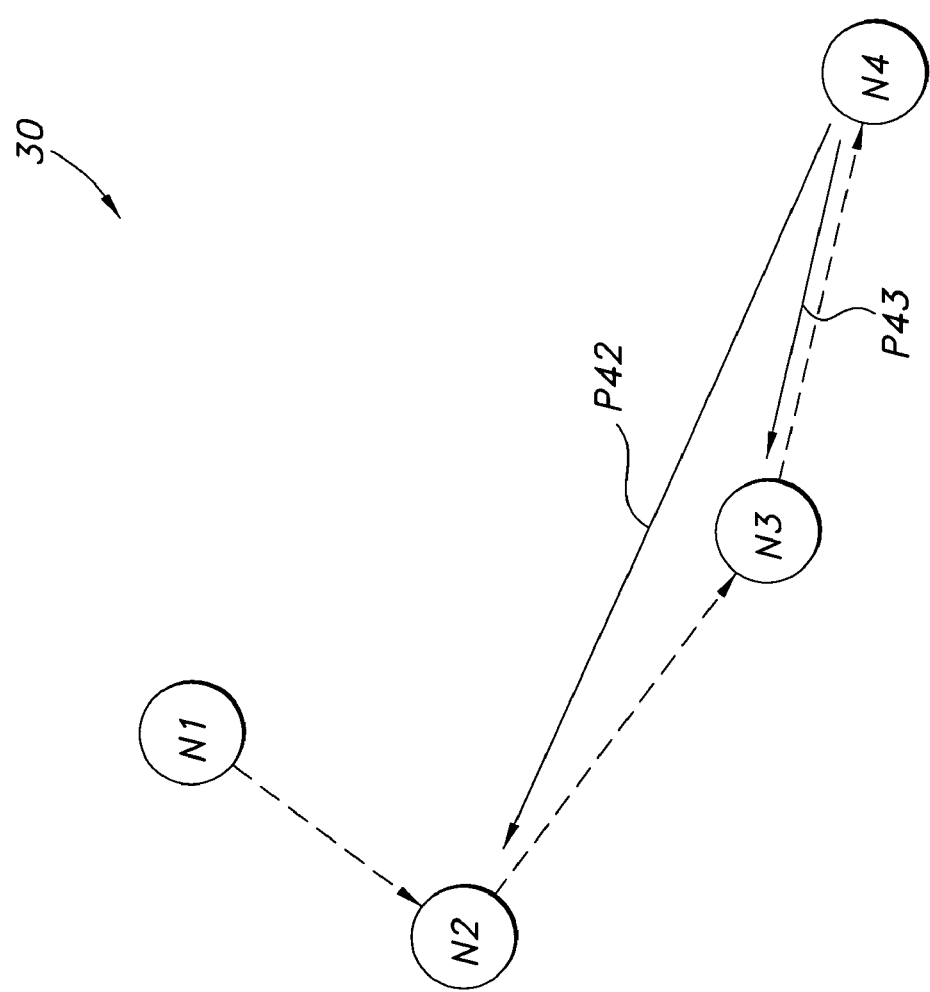
FIG. 5 is a simplified plan view of a communications network according to the invention.

If after a certain number (e.g., 2) of retransmission attempts an acknowledgement message is not received from node N1, or if it was previously determined that node N1 is not within the expected line-of-sight communications range of Node 4, node N4 revises the entries in its directional transmission path table to reflect the assumption that path P41 is blocked. Node N4 then attempts to send the data package using directional antenna 16 to another node that is more likely to have a good directional transmission path to node N1. This other node, which may be called a proxy node, is most likely to be closer to node N1 than node N4 is. In one embodiment of the invention, as shown in FIG. 5, node N4 identifies a proxy node as the node closest to node N1 that has a good directional transmission path to node N4. In this embodiment node N4 consults its directional transmission path table and determines that node N2, only one hop away from node N1, has a good directional transmission path. Node N4 then repeats the process of determining whether the path from node N4 to node N2 is within the expected line-of-sight communications range, and if so, node N4 transmits the data package to node N2 via directional transmission path P42 with instructions for N2 to re-transmit the data package to node N1. Node N4 enters the transmission into the retransmit queue as previously described. Node N2 receives the data package, acknowledges receipt of the data package by including an acknowledgement message in its bootstrap data package, and transmits the bootstrap data package using its omnidirectional antenna. Node N2 then transmits the data package to node N1 using the process previously described. Node N1 responds to the data package from node N2 (the proxy node) by sending an acknowledgement message in its bootstrap data package to both the proxy node (node N2) and the node originating the data package transmission (node N4). If node N4 does not receive an acknowledgement message from node N2 and node N1 within the predetermined re-transmit time, node N4 either retransmits the message to node N2 as previously described or designates the directional transmission path between node N4 and node N2 as blocked. Node N4 then identifies another potential proxy node by determining the next closest node to node N1 that has a good directional transmission path to node N4, which in the network depicted in FIG. 5 would be node N3. Node N4 repeats the process as described until an acknowledgement is received from node N1, or until it is determined the data package is so outdated that it would be best to cancel further attempted transmissions of the data package.

The identification of a suitable proxy node has been described as determining the closest node to the receiving node that has a good directional transmission path to the transmitting node. In FIG. 5 the proxy node first identified in this manner would be node N2, and if node N2 proves to be unsuitable node N3 would be identified as the proxy node. However, in large networks or in networks where connections between nodes are highly tenuous, it may be difficult to predict whether a distant proxy node will have a valid directional transmission path to the receiving node. In another embodiment of the invention the proxy node is identified by determining the closest node to the transmitting node that has a good transmission path to the transmitting node. In the network shown in FIG. 3 the first identified proxy node would be node N3, and if directional transmission path P43 proves to be unsuitable node N2 would be identified as the proxy node.

Figure 6:
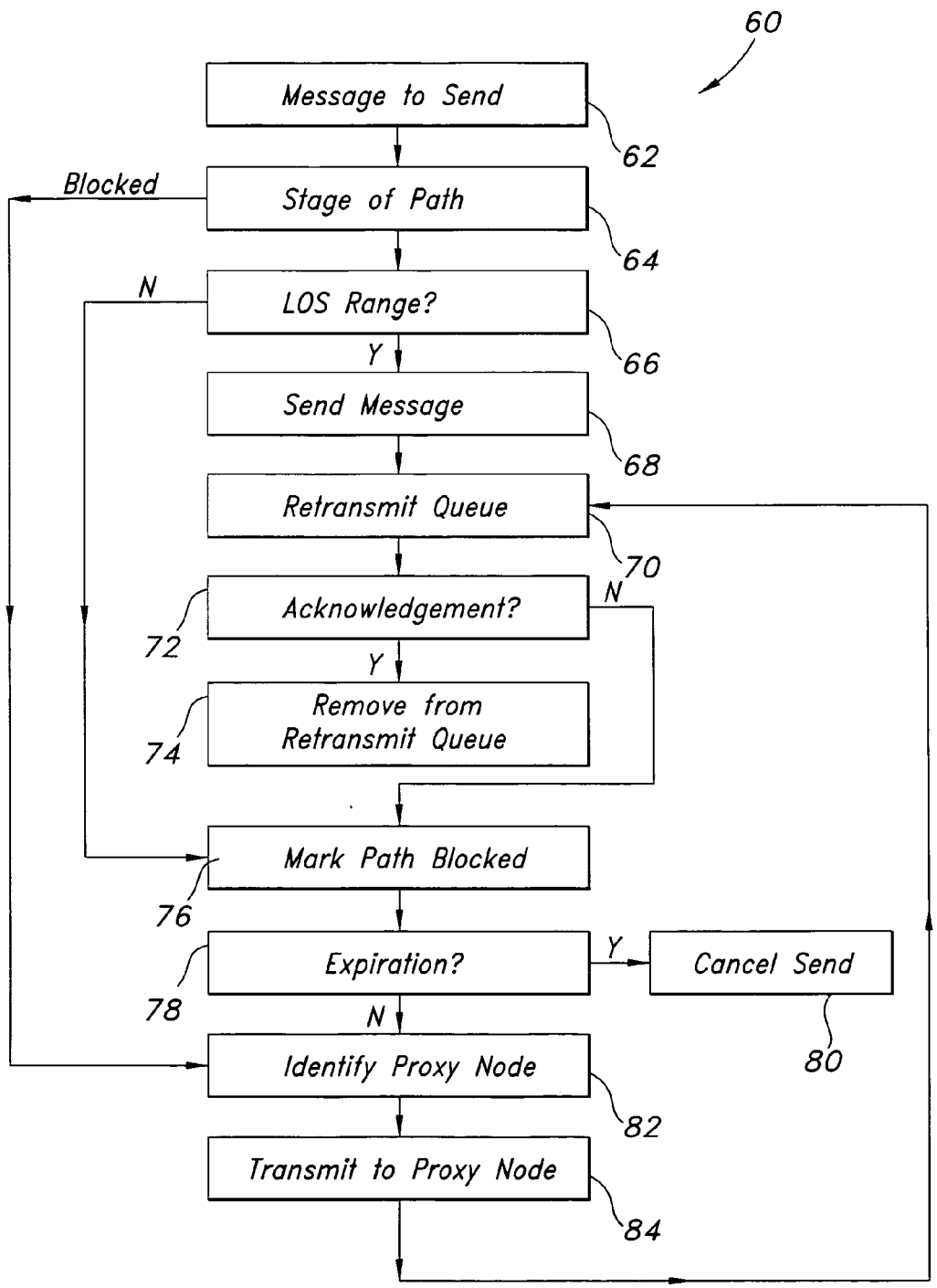
FIG. 6 is a flowchart of a method according to the invention.

FIG. 6 is a flowchart showing a method 60 according to the invention. At 62 a transmitting node has a data package or message to send to a destination node in an ad-hoc network. At 64 the transmitting node determines whether the directional transmission path between the transmitting node and the destination node is good, blocked, or unknown. If the directional transmission path therebetween is blocked, the transmitting node identifies a proxy node as will be discussed further in method 60. If the directional transmission path between the transmitting node and the destination node is good, at 66 the transmitting node determines whether the destination node is within the expected line of sight communications range. This may be done by estimating the signal-to-noise ratio or path loss of a directional transmission between the two nodes based in part upon their relative locations. If the destination node is within the expected line of sight communications range, at 68 the transmitting node sends the message to the destination node using a directional antenna. At 70 the transmitting node places in a retransmission queue a copy of the message or an address in a memory where a copy of the message is stored. If at 72 an acknowledgement from the receiving node is received by the transmitting node through an omnidirectional network transmission within a predetermined time, at 74 the transmitting node removes the message or message address from the retransmission queue. If an acknowledgement from the receiving node is not received by the transmitting node through the omnidirectional network transmission within the predetermined time, at 76 the transmitting node marks as 'blocked' the directional transmission path between the transmitting node and the receiving node. At 78 the transmitting node determines whether the maximum wait time for sending the message has expired, and at 80 the transmitting node removes the message or message address from its retransmit queue if the maximum wait time for sending the message has indeed expired. If the maximum wait time has not yet expired, at 82 the transmitting node identifies a proxy node to which the message can be sent via the directional antenna. The proxy node is selected as the node nearest the receiving node that has a good directional transmission path to the transmitting node. Alternatively, the proxy node is selected as the node nearest the transmitting node that has a good directional transmission path thereto. At 84 the transmitting node transmits the message to the selected proxy node. The method returns to 70 where the transmitting node places the message or message address in its retransmit queue and waits for an acknowledgement, through omnidirectional transmission, that the proxy node has received the message.

Because of the inherent mobile nature of nodes in an ad-hoc mobile network, it is possible that the circumstances causing a directional transmission path marked as BLOCKED may change so that the directional transmission path is no longer blocked. For example, a mobile node may move out from behind a mountain or tall building that had previously directional transmissions between it and a transmitting node. The invention permits nodes marked BLOCKED to be revisited after a given time, termed a blocking time, to see whether directional transmissions to that node are once again possible. According to the invention, after the blocking time has elapsed a BLOCKED directional transmission route is marked as UNKNOWN, and the transmitting node is once again free to attempt directional transmissions using that route. The predetermined time is preferably based at least in part upon the relative velocities of the blocked node and the transmitting node. The relative velocities of the two nodes are indicative of the probability that at least one of the two nodes has moved away from the natural or manmade obstruction that caused the transmission route to be blocked. To encourage efficient directional transmissions within the network, routes marked as UNKNOWN may be attempted to be used at a lesser frequency than routes marked as GOOD.

The invention as described discloses a mobile ad-hoc network having directional and omnidirectional transmission capability at each node in the network. When a directional transmission to a node is unavailable due to obstructions or poor reception, the directional transmission is re-routed to a node having a reliable directional transmission route. The invention therefore provides the advantage of high-throughput capability even when one or more directional transmission routes or paths are blocked or otherwise obstructed.

Another advantage of the invention is that because of the multi-path nature of omnidirectional transmissions, network bootstrap information is unaffected by obstructions or poor reception along any one path. This increases the robustness of the network.

Still another advantage is that blocked or obstructed directional routes periodically tested to see if they are usable. This renews and strengthens the network.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A method of communicating in a mobile ad-hoc network having a plurality of nodes, each node configured to transmit to and receive information, directionally and omnidirectionally from other nodes in the network, the method comprising:
    determining whether a first directional transmission path between a transmitting node and a destination node is known to be free from obstruction;
    the transmitting node transmitting a message to the destination node using the first directional transmission path;
    retransmitting the message to the destination node using the first directional transmission path when a message receipt acknowledgement in an omnidirectional network transmission has not been received within a predetermined time;
    blocking additional transmissions via the first directional transmission path when the message receipt acknowledgement in the omnidirectional network transmission has not been received after more than a pre-set number of retransmissions; and
    transmitting the message to a proxy node using a second directional transmission path between the transmitting node and the proxy node based on the message receipt acknowledgement in the omnidirectional network transmission not being received, the message comprising instructions for the proxy node to directionally transmit the message to the destination node.

2. The method of claim 1, wherein the proxy node is selected as a node nearest the destination node that has an unobstructed directional transmission path to the transmitting node.

3. The method of claim 1, wherein the proxy node is selected as a node nearest the transmitting node that has an unobstructed directional transmission path to the destination node.

4. The method of claim 1, further comprising:
    transmitting the message to the proxy node using the second directional transmission path when it is determined it is unknown whether the first directional transmission path is free from obstruction.

5. The method of claim 4, further comprising:
    transmitting the message to the destination node using the first directional transmission path when, for a preset amount of time, it has been unknown whether the first directional transmission path is free from obstruction.

6. The method of claim 1, further comprising:
    after blocking additional transmissions via the first directional transmission path for a blocking time, attempting to transmit the message via the first directional transmission path.

7. The method of claim 6, wherein the blocking time is a function of relative velocity between the transmitting node and the destination node.

8. The method of claim 1, further comprising:
    transmitting network bootstrap data through the network using omnidirectional transmissions.

9. The method of claim 1, further comprising:
    the transmitting node maintaining a listing of directional transmission paths between the transmitting node and other nodes in the network, the listing indicating whether each directional transmission path is available for transmitting the message, wherein determining whether the first directional transmission path is known to be free from obstruction includes consulting the listing.

10. The method of claim 1, further comprising:
the transmitting node determining whether the destination node is within directional transmission communications range of the transmitting node.

11. A method of communicating in a mobile ad-hoc network having a plurality of nodes, the method comprising:
transmitting network bootstrap data through the network using omnidirectional transmissions;
the transmitting node transmitting a message to the destination node using a first directional transmission path when the first directional transmission path is known to be free from obstruction;
blocking transmissions via the first directional transmission path when a message receipt acknowledgement in an omnidirectionally transmitted bootstrap data package has not been received after more than a pre-set number of retransmissions; and
transmitting the message to a proxy node using a second directional transmission path between the transmitting node and the proxy node based on the message receipt acknowledgement in the omnidirectionally transmitted bootstrap data package not being received, the message comprising instructions for the proxy node to directionally transmit the message to the destination node, when it is determined the first directional transmission path has been blocked.

12. The method of claim 11, further comprising:
re-transmitting the message to the destination node using the first directional transmission path when the message receipt acknowledgement has not been received within a predetermined time.

13. The method of claim 11, wherein the proxy node is selected as a node nearest the destination node that has an unobstructed directional transmission path to the transmitting node.

14. The method of claim 11, wherein the proxy node is selected as a node nearest the transmitting node that has an unobstructed directional transmission path to the destination node.

15. The method of claim 11, further comprising:
transmitting the message to the proxy node using the second directional transmission path when it is determined it is unknown whether the first directional transmission path is free from obstruction.

16. The method of claim 15, further comprising:
transmitting the message to the destination node using the first directional transmission path when, for a preset amount of time, it has been unknown whether the first directional transmission path is free from obstruction.

17. The method of claim 11, further comprising:
after blocking additional transmissions via the first directional transmission path for a blocking time, attempting to transmit the message via the first directional transmission path.

18. The method of claim 17, wherein the blocking time is a function of relative velocity between the transmitting node and the destination node.

19. The method of claim 11, further comprising:
the transmitting node maintaining a listing of directional transmission paths between the transmitting node and other nodes in the network, the listing indicating whether each directional transmission path is available for transmitting the message, wherein determining whether the first directional transmission path is known to be free from obstruction includes consulting the listing.

20. A communications device for use in a mobile ad-hoc network, comprising:
a transceiver configured to transmit and receive messages to and from other communications devices in the network;
an omnidirectional antenna connected to the transceiver and configured to broadcast and detect network bootstrap data to and from the other communications devices in the network;
a directional antenna connected to the transceiver and configured to broadcast and detect messages to and from the other communications devices in the network;
a memory that maintains a list of directional transmission paths from the communications device to other communications devices in the network, the list also including a status of each directional transmission path; and
a processor that instructs the transceiver to transmit a message to a first one of the other communications devices in the network using a first directional transmission path when the status of the first directional transmission path indicates the first directional transmission path is unobstructed, the processor instructing the transceiver to retransmit the message to the first one of the other communication devices using the first directional transmission path when a message receipt acknowledgement in an omnidirectional network transmission has not been received within a predetermined time; and the processor instructing the transceiver to block additional transmissions via the first directional transmission path when the message receipt acknowledgement in the omnidirectional network transmission has not been received after more than a pre-set number of retransmissions; the processor instructing the transceiver to transmit the message to a second one of the other communications devices in the network using a second directional transmission path based on network bootstrap data received from an omnidirectional network, the message comprising instructions for the second one of the other communications devices to transmit the message to the first one of the other communications devices when the status of the first one of the other communications devices indicates the first directional transmission path is obstructed.

* * * * *